United States Patent [19]

Stocchiero

[11] Patent Number: 5,725,396
[45] Date of Patent: Mar. 10, 1998

[54] CONNECTION DEVICE FOR THE POLES OF ELECTRIC ACCUMULATORS

[76] Inventor: Olimpio Stocchiero, Via Kennedy, 4 - 36050, Montorso Vicentino, Italy

[21] Appl. No.: 617,784

[22] PCT Filed: Oct. 4, 1994

[86] PCT No.: PCT/EP94/03285

§ 371 Date: Jun. 14, 1996

§ 102(e) Date: Jun. 14, 1996

[87] PCT Pub. No.: WO95/10857

PCT Pub. Date: Apr. 20, 1995

[30] Foreign Application Priority Data

Oct. 12, 1993 [IT] Italy .................. VI93A0159

[51] Int. Cl.$^6$ .................................................. H01R 13/52
[52] U.S. Cl. .................................. 439/627; 439/521
[58] Field of Search ................. 439/627, 500, 439/522, 521, 504; 429/158, 159, 121, 178, 179, 181, 185

[56] References Cited

U.S. PATENT DOCUMENTS 4,420,213 12/1983 Julian et al. ............. 439/522
4,483,910 11/1984 Julian et al. ............. 429/179

FOREIGN PATENT DOCUMENTS 8520278 9/1985 Germany.
8600312 2/1986 Germany.
3736414 11/1988 Germany.
WO 94/13023 6/1994 WIPO.

*Primary Examiner*—Gary F. Paumen
*Attorney, Agent, or Firm*—Watson, Cole Stevens Davis, P.L.L.C.

[57] ABSTRACT

The invention discloses a connection device for the electric connection between the poles of accumulators which comprises: a connecting electric cable (2) ending at each of its extremities with a conductor ring (3), the hole (4) of which lodges a connecting screw (5) connecting said cable to an electric pole (6) of the accumulator; an insulation coating made of plastic material (1), wherein the part having a smaller diameter is sealed with a lid and the part having a larger diameter rests on the surface (9) of the lid of the accumulator and having a first annular wall (11) in form of a cylinder of the same diameter as the head of the connecting screw (5) having its base on the surface of the conductor ring in contact with said head (52) of the connecting screw (5); a lid (90) for sealing each insulation coating. Said insulation coating (1) presents a second annular wall (12) concentric with said first annular wall (11), having a larger diameter and over lapping said first annular wall, the portion of insulation coating comprised between said second and said first wall lodging in an annular notch (110) obtained in correspondence with the bottom of the head of the connecting screw.

5 Claims, 2 Drawing Sheets

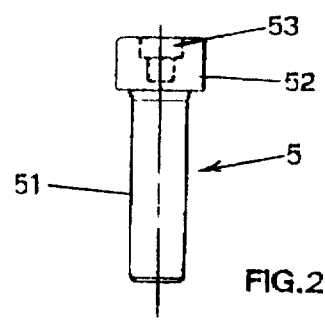
FIG. 2
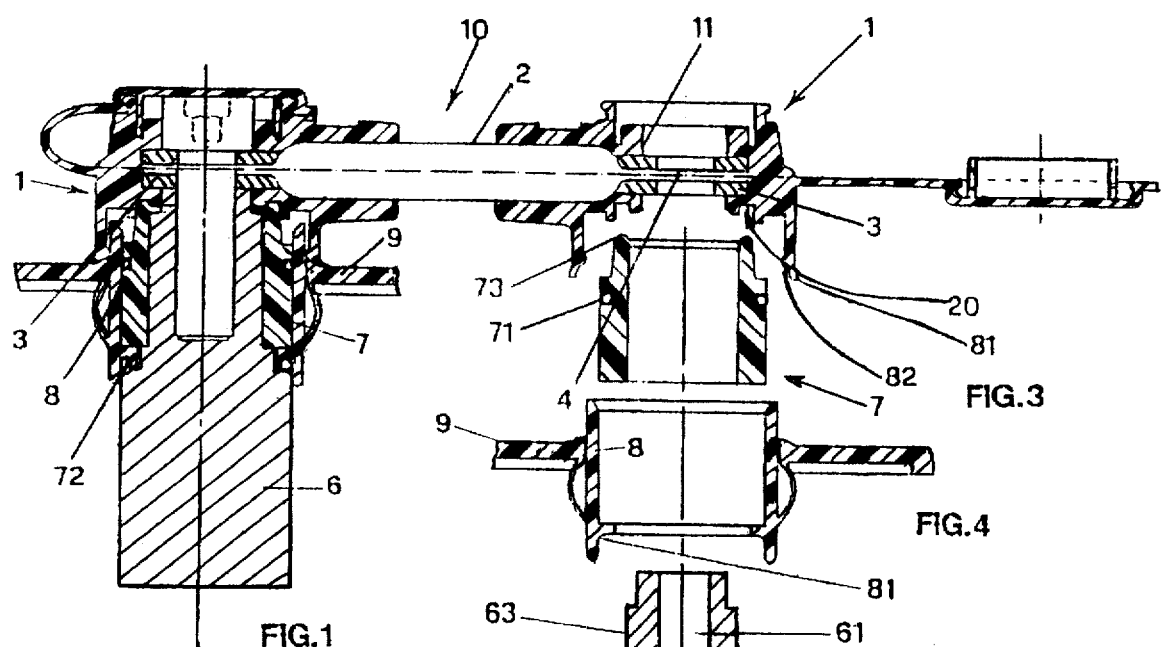
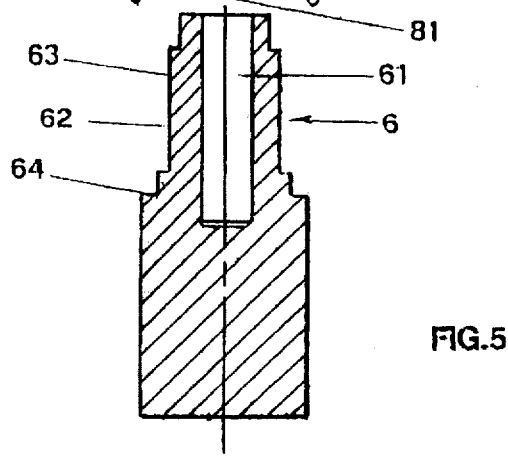

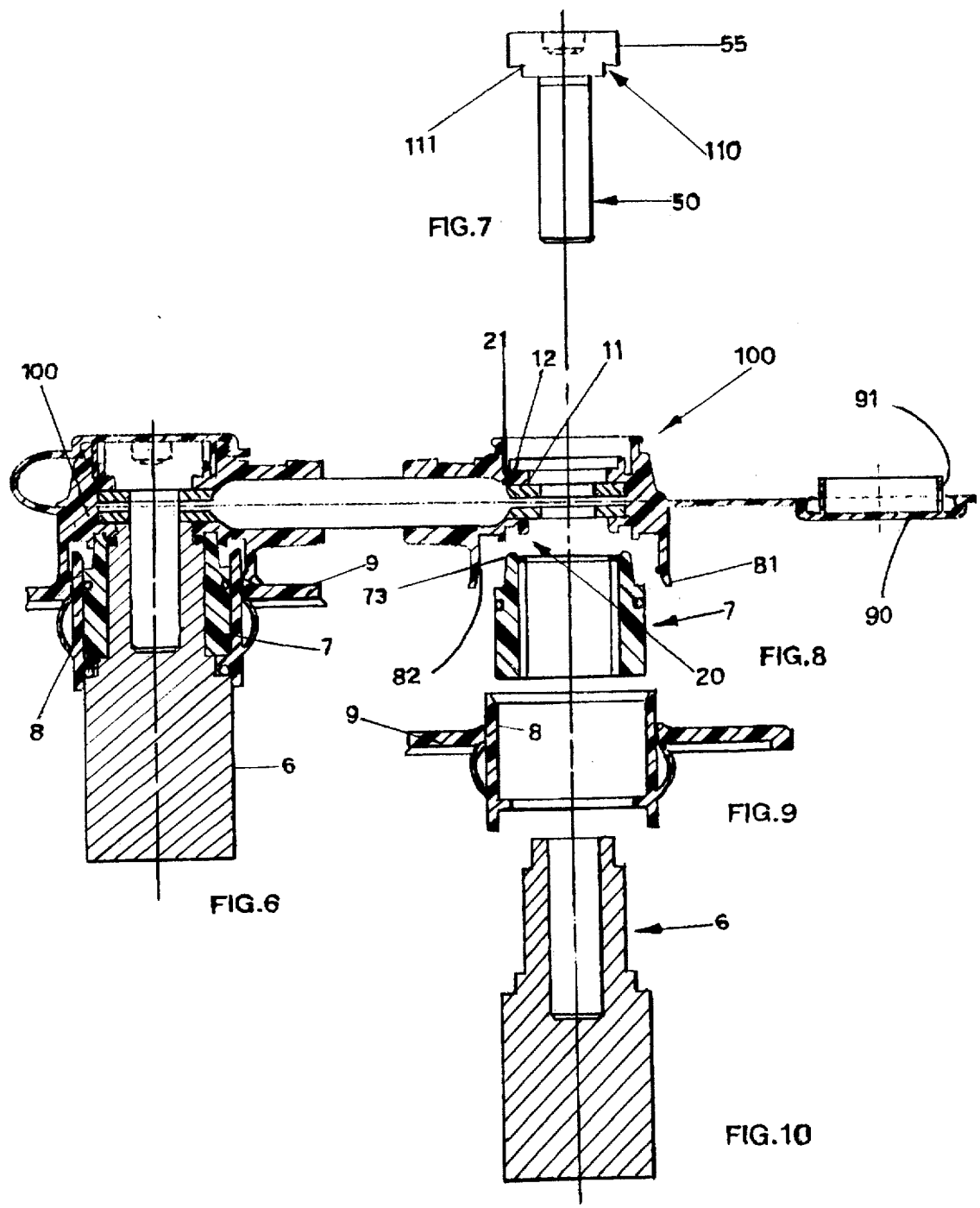

CONNECTION DEVICE FOR THE POLES OF ELECTRIC ACCUMULATORS

BACKGROUND OF THE INVENTION

The invention concerns a connection device for electrically connecting the poles of accumulators.

It is a known fact that the accumulators consist of elementary batteries, the positive and negative poles of which are connected with each other in series in order, to obtain the required voltage resulting from the accumulator. In order to realize the serial connections, it is then necessary to place some connections between a positive pole and a negative pole, between two adjacent battery elements.

As it is known, the connectors are electric cables which connect adjacent poles and consist of a conductor ending with two rings through which the required connections between the poles are obtained. The electric cable and the rings are electrically insulated and for this purpose they are coated with a coating of insulating material, usually molded of plastic.

More specifically, the connector device is made of molded plastic material. An insert of the already pre-set electric cable is usually included in the mould.

One of the inconveniences of the connection devices of the known type is that, while the accumulator is operating, the electrolyte may go up through the pole in the interstices which are present between the terminal part of the pole and the connection, until it can flow out of the connection itself and overflow over the lid of the battery, thereby creating clear problems of both chemical abrasion and also possible discharges between a polarity and the other.

The proposed purpose of the present invention is to obtain a connection device which presents an insulating coating having a configuration such as to avoid or reduce to remote accidental events any chances the overflow of the electrolyte.

SUMMARY OF THE INVENTION

The purposes of the present invention and others which will be better illustrated hereinafter are achieved by a connection device for the electric connection between the poles of accumulators, comprising:

a connecting electric cable ending in each of its extremities with a conductor ring, the hole of which lodges a connecting screw having a fillister head electrically and mechanically connecting said cable with an electric pole of the accumulator;

an insulation coating made of plastic material circumferentially arranged around each conductor ring and belonging to the insulating element which coats said connection device, said insulation coating presenting externally the essential shape of a truncated-cone, wherein the part having a smaller diameter is sealed with a lid and the part having a larger diameter rests on the surface of the lid of the accumulator and having a first annular wall in form of a cylinder of the same diameter as the fillister head of the connecting screw, having its base on the surface of the conductor ring in contact with the head of the connecting screw and extending itself for a certain section along the cylindrical wall of said head of said screw, said annular wall co-operating with said screw head in order to ensure a watertight seal preventing the leakage of electrolyte;

a lid for sealing each insulation coating, said connection device is characterized in that said insulation coating presents a second annular wall concentric with said first annular wall, having a larger diameter and overlapping said first annular wall, the portion of insulation coating comprised between said second and said first wall lodging in an annular notch obtained in correspondence with the bottom of the head of the connecting screw.

According to a modified embodiment of the invention, to the first annular profile are added an insulation coating and a second annular profile opposite to the first one and contrasting with the opposite flat surface of the conductor ring, so that this profile engages with the rim of the cylindrical sleeve which is present between the pole and the lid of the accumulator.

Another embodiment foresees that in addition the truncated-conic part having a larger diameter which rests on the surface of the lid presents a rim spreading outward, so as to increase the sealing effect of such a rim.

Not the last advantage is that a circular slot obtained in the thickness of the first annular profile is also foreseen. This is suited to lodge the cylindrical rim of the lid which inserts itself into the insulation coating having a truncated-conic shape.

BRIEF DESCRIPTION OF THE DRAWINGS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description and from the drawings, wherein:

FIG. 1 shows a first embodiment of the invention wherein, on the left-hand side the connection device according to the invention is already attached to a pole of an accumulator, while on the right-hand side the other part of the connection device according to the invention is shown before it is attached to the pole of an accumulator;

FIG. 2 shows the screw which ties the connection device of FIG. 1 to the pole of a battery element;

FIG. 3 shows the sleeve interposed between the pole and the connection device of FIG. 1;

FIG. 4 shows in a partial cross-section representation the lid of the accumulator of FIG. 1;

FIG. 5 shows in a cross-section representation a pole of the accumulator;

FIG. 6 shows a modified embodiment of the connection device according to the invention;

FIG. 7 shows a screw suited to attach the connection device of FIG. 6 to the pole of a battery element;

FIGS. 8, 9, 10 show the sleeve, the partial cross-section representation of the lid and the cross-section representation of the pole, respectively, similar to those shown in the FIGS. 3, 4, 5.

DESCRIPTION OF THE INVENTION

With reference to the mentioned Figures, it can be observed that the connection device according to the invention, indicated as a whole with 10, presents two equal and symmetrical parts, indicated with 1, wherein an electric cable 2 ends in each extremity with a conductor ring 3 presenting a hole 4 inside which the screw 5 connecting said conductor ring 3 and the pole 6 belonging to the battery element will be inserted. It can be observed that the pole 6 is provided with a hole 61 threaded in 62 so that the threaded part 51 of the screw 5 can connect itself with the pole 6. A sleeve 7 is interposed between the cylindrical seat 8 belonging to the lid 9 of the accumulator and the outer surface 63 of the pole 6. The sleeve 7 is equipped with an OR ring 71 with the purpose of ensuring the seal between the lid and the sleeve. Another OR ring 72 is arranged between the annular surface 64 belonging to the pole 6 and the corresponding annular surface 81 belonging to the cylindrical part 8 of the lid 9 of the accumulator.

With reference to the insulation coating circumferentially arranged around each conductor ring 3, it can be observed that said insulation coating presents a first annular wall, indicated with 11, having the same diameter as the head of the connecting screw 5 and that it extends itself for a certain section of the cylindrical wall 52 of the screw 5, so as to ensure the watertight seal which prevents the leakage of electrolyte. Given the smooth cylindrical surface of the head 52 of the screw 5, said screw is provided with an hexagonal indentation 53 so that it can be easily screwed.

FIG. 6 shows a modified embodiment of the insulation coating according to the invention, now indicated as a whole with 100, wherein to the first annular wall 11 is added a second annular wall 12 which is concentric with the first annular wall 11 but has a larger diameter. Said wall overlaps the first annular wall 11 so as to create a sort of step which finds a lodging in a corresponding annular notch 110 belonging to the screw 50. Said annular notch, as it can be observed in FIG. 7, is obtained in correspondence with the bottom of the head of the connecting screw, so that, when tightening the screw, the portion of insulation coating comprised between the second wall 12 and the first annular wall 11 is squashed inside the lodging 110. When gradually tightening the screw, it is evident that the side 11 of the insulation coating goes to contrast against the wall 111 of the notch 110. Moreover, the cylindrical part of the head 55 above the notch 110 gets in contact with the second annular wall 12. In such a way, a double seal is ensured, one in correspondence with the under-head 110 of the screw 50 and one in correspondence with the cylindrical wall 55 of said screw, the double seal being the portion of insulating material 12.

It is evident that the annular coating 100 of FIG. 6, now described with a double sealing wall 11 and 12, can be used even if it is necessary to ensure less severe sealing conditions, such as in the case of the embodiment shown in FIG. 1. In such a case, the screw of FIG. 2 with the connection of FIG. 6 can be used. Such a screw, having the head of the same diameter as the diameter of the annular wall 12, will ensure the seal only on the diameter 12 instead of in correspondence with the notch 110 of the screw 50.

Another sealing area of the connection device according to the invention is represented by a second annular profile, indicated as a whole with 20, which is opposed to the first annular profile and which contrasts against the opposite flat surface of the conductor ring. This annular profile engages with the rim 73 of the sleeve and essentially acquires the shape of its profile so that, once the sleeve has been assembled and when the screw 5 of FIG. 1 or the screw 50 of FIG. 6 is screwed tight on the pole 6, another sealing area between the connection and the sleeve is obtained.

It is well understood that to have realized the annular profiles of the insulation coating in the way now described, leads to reduce in a relevant way, if not to annul, the chances for the electrolyte to overflow even through the connecting screw.

Another sealing element which is offered by the connection device according to the invention is represented by the lower rim 81 spreading outward which, as can be observed in FIG. 1 ahd in FIG. 6, once the connector has been assembled, it ensures a firm contact in at least one circular sealing surface on the lid of the accumulator. Moreover, inside and near the rim 81, the connection device presents an annular collar 82 interfering with the cylindrical outer surface 8 of the lid 9.

Another relevant improvement of the connection device according to the invention as compared with the known technique, consists in that each lid 90 which seals each insulation coating 1, presents a cylindrical rim 91 which lodges inside a circular slot 21 being essentially concentric with the first annular profile 11.

Another sealing element between the connection and the cap is thus achieved.

As it could be seen, with the connector device according to the invention, the proposed purpose of the invention has been achieved, that is to obtain a connection device having such a configuration of the insulation part to ensure a labyrinth seal type, so as to avoid any possible overflow of electrolyte.

I claim:

1. A connection device for preventing leakage of electrolyte from an accumulator and for electrically connecting the poles of said accumulators comprising:

a connecting electrical cable having end portions;

a conductor ring for each end portion;

a fillister head screw for electrically and mechanically connecting each connector ring of the cable to a corresponding pole of the accumulator;

an insulation coating formed of plastic material circumferentially arranged around each conductor ring and having an opening with respective larger and smaller diameters, the insulation coating further having a first annular wall in the shape of a cylinder of said first diameter sized for receiving the head of the connecting screw for engaging the conductor ring, said first annular wall extending along a selected distance of said head and cooperating therewith in order to form a watertight seal for preventing leakage of electrolyte from the accumulator, wherein the opening in the insulation coating has a second annular wall concentric with the first annular wall and having the larger diameter, the first and second walls forming a stepped wall portion for engaging a corresponding portion of the screw head; and a lid for engaging and sealing the opening to the insulation coating over the head of the screw.

2. A connection device according to claim 1, wherein the insulation coating has an annular profile opposite the first and second annular walls for contacting an opposite surface of the conductor ring.

3. A connection device according to claim 2, further comprising a cylindrical sleeve interposed between the pole and the lid and having a rim in confronting relationship with the annular profile of said insulation coating.

4. A connection device according to claim 3, wherein the accumulator has a lid and the annular profile has a depending rim being spreadable for engaging and forming a circular seal with the accumulator lid, the accumulator lid having an upstanding cylindrical portion and said annular profile further including a collar portion on an inner surface thereof performing an interference fit with the upstanding cylindrical portion of the accumulator lid.

5. A connection device according to claim 1, wherein the lid is formed with a top portion and a depending cylindrical wall for engaging a slot formed in the opening of the insulation coating for covering the screw head.

* * * * *